US011938666B2

(12) United States Patent
Whitta et al.

(10) Patent No.: US 11,938,666 B2
(45) Date of Patent: Mar. 26, 2024

(54) SIDE SHOT SYSTEM, METHOD, AND TOTE MANUFACTURED THEREFROM

(71) Applicant: CREATIVE PLASTIC CONCEPTS, LLC, Sycamore, OH (US)

(72) Inventors: Jacob H. Whitta, Findlay, OH (US); Eric Hummel, Findlay, OH (US)

(73) Assignee: CREATIVE PLASTIC CONCEPTS, LLC, Sycamore, OH (US)

( * ) Notice: Subject to any disclaimer, the term of this patent is extended or adjusted under 35 U.S.C. 154(b) by 131 days.

(21) Appl. No.: 17/085,460

(22) Filed: Oct. 30, 2020

(65) Prior Publication Data
US 2021/0129399 A1 May 6, 2021

Related U.S. Application Data

(60) Provisional application No. 62/928,019, filed on Oct. 30, 2019.

(51) Int. Cl.
| | |
|---|---|
| B29C 45/27 | (2006.01) |
| B29C 45/76 | (2006.01) |
| B29C 45/78 | (2006.01) |
| B29L 31/00 | (2006.01) |
| B65D 1/22 | (2006.01) |

(52) U.S. Cl.
CPC ...... *B29C 45/2708* (2013.01); *B29C 45/7653* (2013.01); *B29C 45/78* (2013.01); *B65D 1/22* (2013.01); *B29C 2045/2716* (2013.01); *B29C 2945/76531* (2013.01); *B29C 2945/76561* (2013.01); *B29C 2945/76658* (2013.01); *B29C 2945/76702* (2013.01); *B29C 2945/76859* (2013.01); *B29C 2945/76869* (2013.01); *B29L 2031/712* (2013.01)

(58) Field of Classification Search
None
See application file for complete search history.

(56) References Cited

U.S. PATENT DOCUMENTS

| | | | |
|---|---|---|---|
| 6,261,075 B1 | 7/2001 | Lee et al. | |
| 2013/0259969 A1* | 10/2013 | Schmidt | B29C 45/74 425/549 |

* cited by examiner

*Primary Examiner* — Arrie L Reuther
*Assistant Examiner* — Virak Nguon
(74) *Attorney, Agent, or Firm* — Jacob M. Ward; Ward Law Office LLC

(57) ABSTRACT

A storage container manufactured from an injection molding process which includes a mold and at least one injector. The mold has a top surface, a bottom wall, a plurality of side surfaces, and at least two separable sections. Where the at least two separable sections are in a closed position, a cavity is formed in the mold. The at least one injector is disposed through at least one of the plurality of sidewalls and further disposed into the cavity. The storage container has a plurality of sidewalls, an upper edge, and a bottom surface. At least one of the plurality of sidewalls of the resulting storage container contains at least one sprue mark.

7 Claims, 7 Drawing Sheets

SIDE SHOT SYSTEM, METHOD, AND TOTE MANUFACTURED THEREFROM

CROSS REFERENCE TO RELATED APPLICATIONS

This application claims the benefit of U.S. Provisional Application Ser. No. 62/928,019, filed on Oct. 30, 2019. The entire disclosure of the above application is incorporated herein by reference.

FIELD

The present disclosure relates to injection molding systems and, more particularly, to hot runner injection molding systems.

INTRODUCTION

This section provides background information related to the present disclosure which is not necessarily prior art.

Injection molding is a manufacturing process for producing one or more parts by injecting molten material into a mold. Injection molding can be performed with a host of materials mainly including metals (for which the process is called die-casting), glasses, elastomers, confections, and most commonly thermoplastic and thermosetting polymers. Injection molding is well known in the art. For example, U.S. Pat. No. 6,261,075 to Lee describes a hot runner system for coinjection molding. The entire disclosure of this patent is incorporated herein by reference.

Material for a part is fed into a heated barrel, mixed, and injected into a mold cavity, where it cools and hardens to the configuration of the cavity. After a product is designed, usually by an industrial designer or an engineer, molds are made by a mold-maker from metal, usually either steel or aluminum, and precision-machined to form the features of the desired part.

Injection molding is widely used for manufacturing a variety of parts, from the smallest components to entire body panels of cars. Advances in 3D printing technology, such as using photopolymers which do not melt during the injection molding of some lower temperature thermoplastics, can be used for some simple injection molds.

Parts to be injection molded must be very carefully designed to facilitate the molding process; the material used for the part, the desired shape and features of the part, the material of the mold, and the properties of the molding machine must all be considered. The versatility of injection molding is facilitated by this breadth of design considerations and possibilities.

When plastic totes are manufactured via conventional injection molding, the mold includes injection gates on the bottom portion of the tote in the mold. These bottom gates supply plastic melt to the entire mold. These systems require relatively large amounts of clamp tonnage and injection pressure to ensure the mold is completely filled. The resulting plastic tote has relatively high stress points on the bottom walls, which leads to a less durable final product. Also, to reduce injection pressure and required clamp tonnage to prevent flashing, melt temperatures often need to be elevated above recommended manufacturing ranges to reduce viscosity and improve flowability. Unfortunately, this degrades the thermoplastic physical properties, which has negative effects on part quality and strength.

Accordingly, there is a continuing need for an injection molding system that requires less clamp tonnage and injection pressure. Desirably, the injection molding system would allow for a lower melt temperature and improved part quality and strength.

SUMMARY

In concordance with the instant disclosure, an injection molding system that requires less clamp tonnage, less injection pressure and, which allows for a lower melt temperature and improved part quality and strength, has surprisingly been discovered.

In certain embodiments, a storage container is provided that has a body formed by an injection molding process. The body has a plurality of sidewalls, an upper edge, and a bottom surface. The injection molding process includes injecting a molten material into at least one of the plurality of sidewalls of the storage container.

In certain embodiments, the body formed by the injection molding process further includes at least one sprue mark on at least one of the plurality of sidewalls. The at least one sprue mark is a physical indication of where the molten material was injected at on the storage container during the injection molding process. As a non-limiting example, the sprue mark may be a circle with a nub located in a substantially central location on the circle.

In certain embodiments, a method for manufacturing a storage container is provided. The method may have a step of providing a mold having a top wall, a bottom wall, a plurality of sidewalls, and at least two separable sections. The at least two separable sections may be selectively disposed in at least one of an open position and a closed position. The first section may be configured to selectively receive the second section, in operation. Where the mold is in the closed position, a cavity may be formed between the two sections. The mold may further include at least one injector disposed through at least one of the plurality of sidewalls and directed at the cavity when the mold is in the closed position. The method may include another step of providing a molten material. Next, the method may have a step of injecting the molten material through the at least one injector disposed through the at least one of the plurality of sidewalls of the mold. Afterwards, the method may include a step of removing the manufactured storage container from the mold.

In certain embodiments, the present technology is drawn to a side shot injection molding system for forming a storage container. The side shot injection molding system includes a mold and at least one injector. The at least one injector may be disposed through at least one of the plurality of sidewalls of the mold and further disposed into the cavity. The side shot injection molding system of the present disclosure may be a hot runner system. It should be appreciated that the mold may be configured to receive thermoplastic melt material, in operation. The mold may be configured to create a plastic tote having a base wall and a plurality sidewalls, as a non-limiting example. The mold may have a plurality of openings configured to receive the at least one injector, as described hereinbelow. It should be appreciated that the openings may be formed in plurality of sidewalls of the mold. The top wall and bottom wall may not contain any of the openings. Advantageously, the placement of the openings on the sidewalls allows the side shot injection molding system to require less clamp tonnage and injection pressure, which allows for a lower melt temperature and improved part quality and strength.

In certain embodiments, a mold is provided that may have four sidewalls with a substantially rectangular cross section and six openings formed therethrough. The four sidewalls may include a first pair of parallel sidewalls and a second pair of parallel sidewalls. Each one of the first pair of sidewalls may have one opening formed therein. Each of the openings of the first pair of sidewalls may be formed substantially parallel from the corresponding opening. Each one of the second pair of sidewalls may have two openings formed therein. Each of the openings of the first pair of sidewalls may be formed substantially parallel to the corresponding opening on an opposite side wall. In other words, each opening may have a corresponding opening formed in an opposite sidewall.

Accordingly, a side shot injection molding process, as provided herein, may have six injectors with each one of the six injectors disposed in each one of the six openings. In operation, the injectors may each inject the thermoplastic melt material on a plane. The plane may be substantially the same plane that the injector disposed parallel in the opposite sidewall injects plastic melt material into the mold.

The present disclosure further provides a method of manufacturing a plastic via the side shot injection molding process. A first step of the method may include providing a side shot injection molding system, as described herein. A second step of the method may also include providing a thermoplastic melt material. Next, the method may include a third step of injecting the thermoplastic melt material through the at least one injector into the mold. The thermoplastic melt material may be injected to form a plurality of sidewalls of the tote. A base wall may be formed when an injection force pushes the thermoplastic melt material through the mold. The method may also include a fourth step of opening the mold. The second section of the mold may be removed after the thermoplastic melt material has cooled. Thus, the plastic tote is formed.

It should be appreciated that the resulting plastic tote has reduced stress compared to a tote manufactured through conventional injection molding, where the molten material is injected at a bottom surface of the storage tote. The reduction of stress in the resulting tote from the side shot injection molding process allows for a more durable product. Further, the injection molding system requires less clamp tonnage compared to conventional injection molding systems, which provides a more efficient and less wasteful system.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
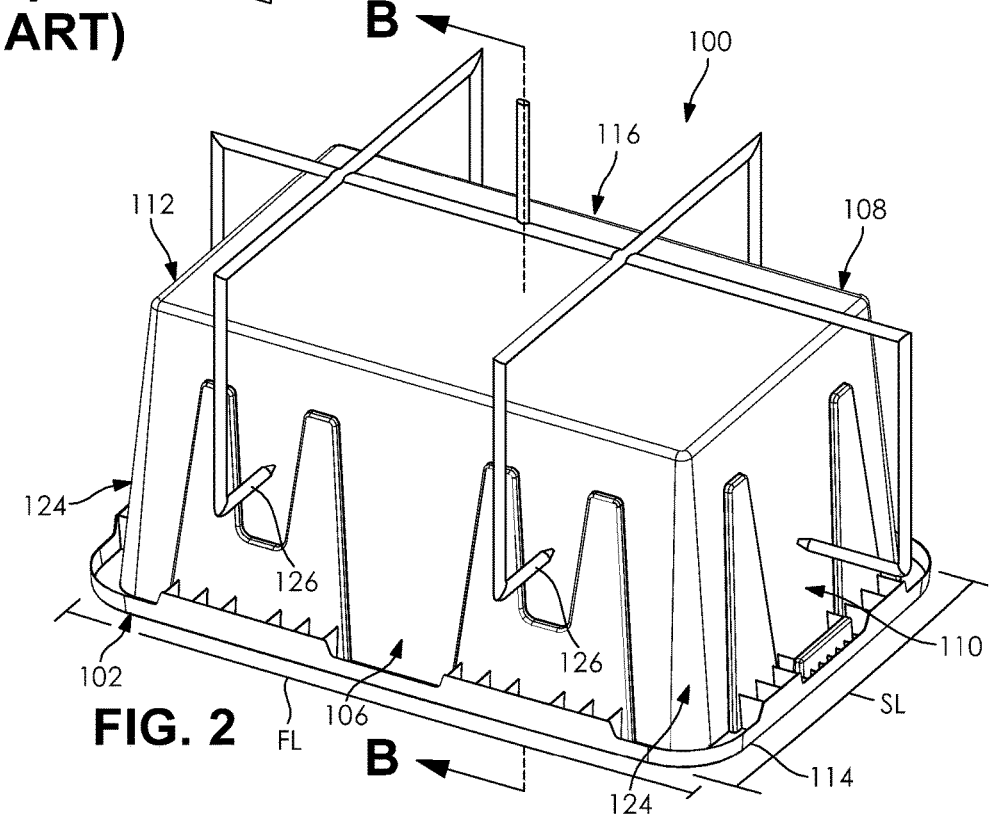
FIG. 2 is a bottom perspective view of a storage tote formed by a side-shot injection molding process, according to one embodiment of the present technology.
Figure 13:
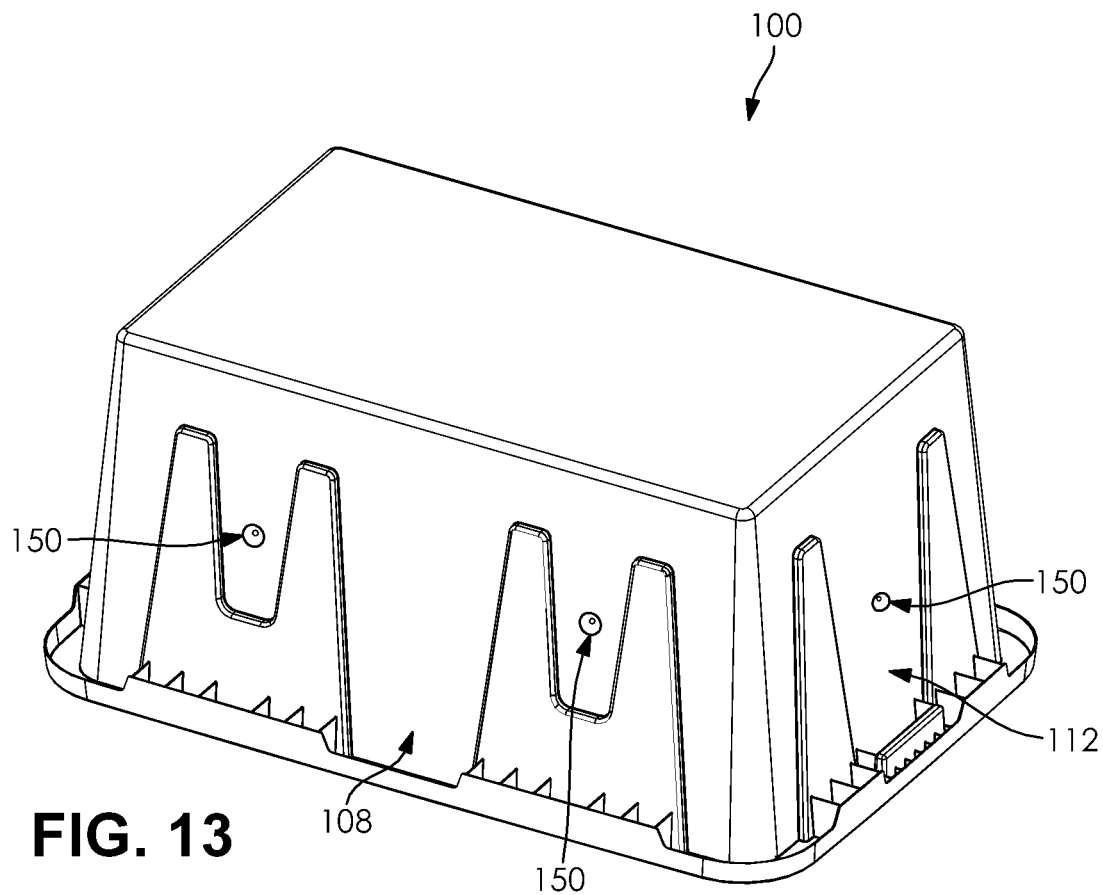
Figure 14:
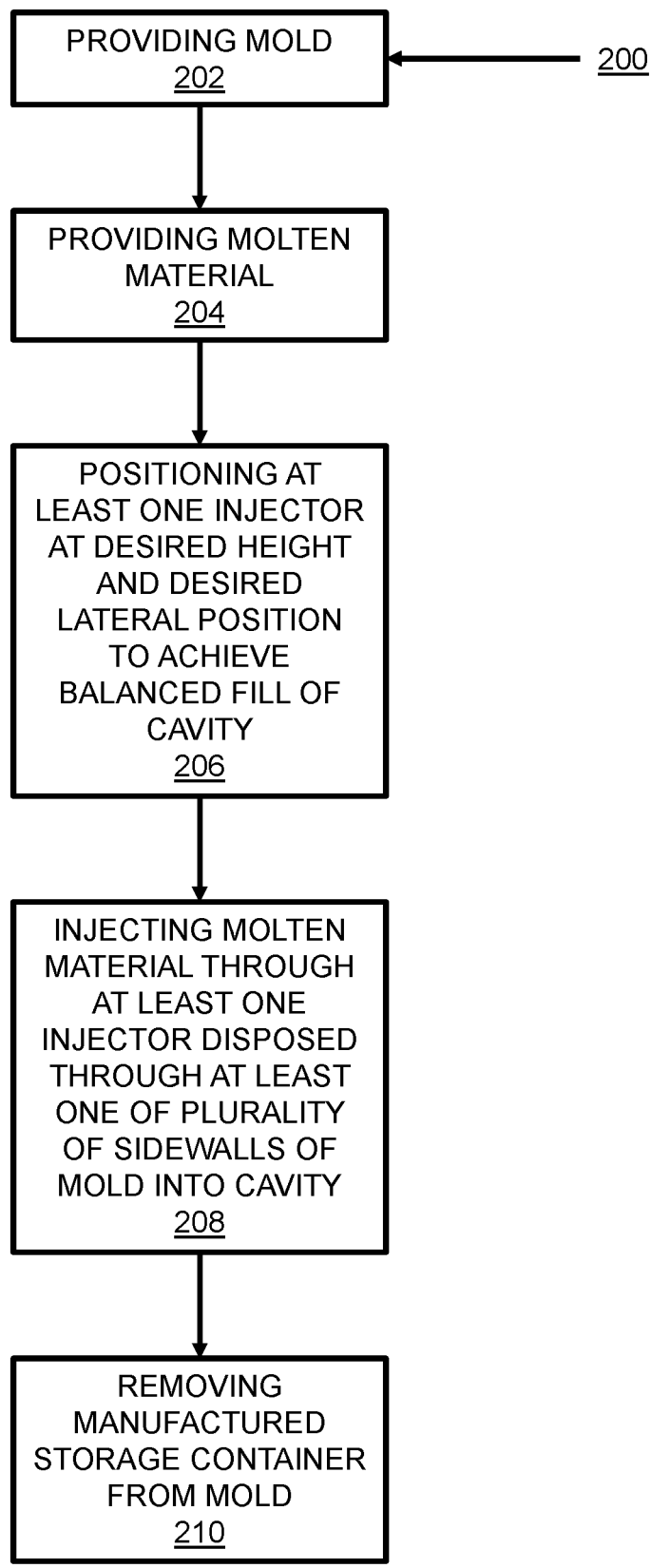

FIG. 13 is bottom perspective view of the storage tote formed by the side-shot injection molding process, as shown in FIG. 2, depicting a plurality of sprue marks on the plurality of sidewalls of the storage tote, according to one embodiment of the present technology; and FIG. 14 is a flowchart of a method for manufacturing the storage tote formed by the side-shot injection molding process, according to one embodiment of the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 2-3, 5, 7, and 13, a storage container 100 has a body 102 which is formed by a side shot injection molding process 104. The body 102 has a plurality of sidewalls 106, 108, 110, 112, an upper edge 114, and a bottom surface 116. The side shot injection molding process 104 may include injecting a molten material 118 into at least one of the plurality of sidewalls 106, 108, 110, 112 of the storage container 100. Advantageously, by injecting the molten material 118 into at least one of the plurality of sidewalls 106, 108, 110, 112, the molten material 118 may be required to travel a lesser distance to fill a mold 120 where compared to a similar storage tote 122 formed by an injection molding process that includes injecting the molten material 118 at a base wall 123 of the storage tote 122, as shown in the prior art of FIGS. 1 and 6.

In one example, the molten material 118 may be injected into the at least one of the plurality of the sidewalls 106, 108, 110, 112 of the storage container 100 at a desired height and a desired lateral position so that the bottom surface 116 and upper edge 114 of the storage tote 100 are substantially simultaneously injected with molten material 118.

In a specific non-limiting example, the molten material 118 used in the side shot injection molding process 104 includes a thermoplastic melt material. In a more specific non-limiting example, the thermoplastic melt material may include propylene.

As shown in FIGS. 2-3, 8, and 13, the plurality of sidewalls 106, 108, 110, 112 may include a first sidewall 106, a second sidewall 108, a third sidewall 110, a fourth sidewall 112, and a plurality of corners 124 therebetween. In a more particular instance, the first sidewall 106 and the second sidewall 108 may each have a first length FL, the third sidewall 110 and the fourth sidewall 112 may each have a second length SL, and the first length FL may be longer than the second length SL. In an even more particular instance, the first sidewall 106 may be disposed on an opposite side of the storage container 100 from the second sidewall 108.

Figure 3:
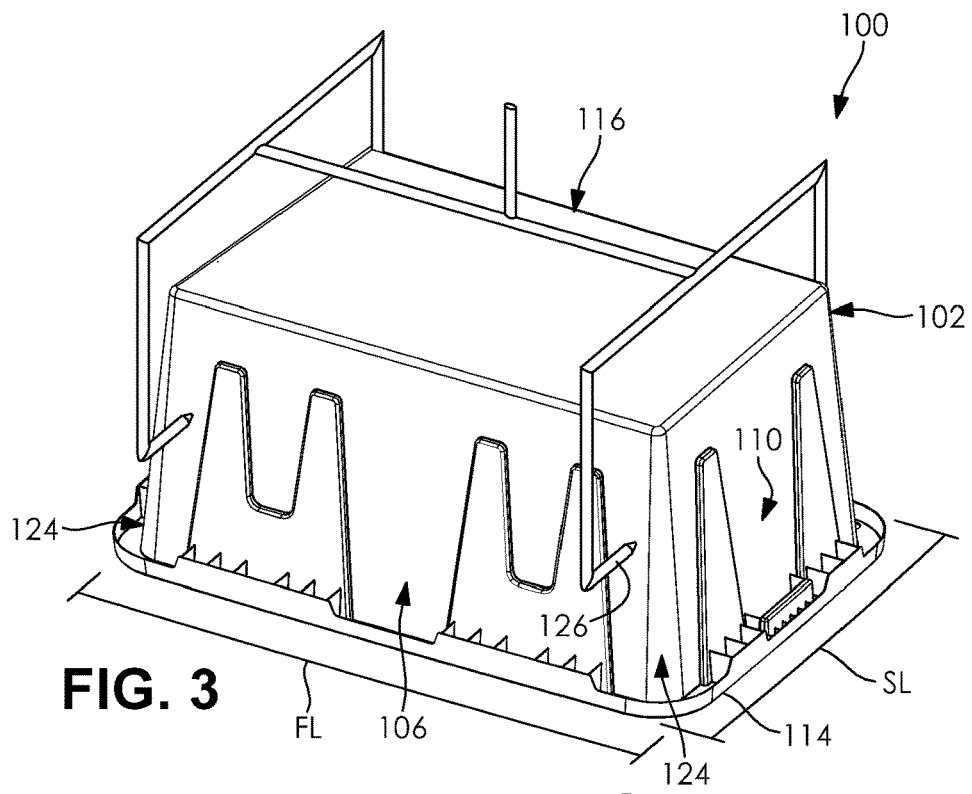
FIG. 3 is a bottom perspective view of the storage tote formed by the side-shot injection molding process, according to another embodiment of the present technology.
Figure 4:
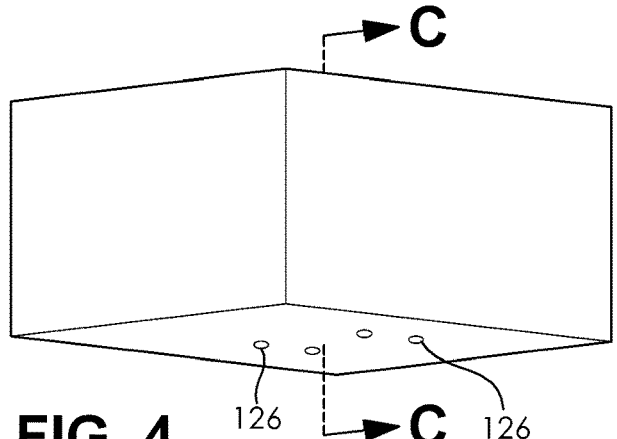
FIG. 4 is a bottom perspective view of a prior art mold apparatus.

In a specific example, as shown in FIG. 3, the side shot injection molding process 104 may include injecting the molten material 118 at only the first sidewall 106 and the second sidewall 108. In a more specific example, the side shot injection molding process 104 may include injecting the molten material 118 at each of the first sidewall 106 and the second sidewall 108 at a desired location near each of the plurality of corners 124 of the storage container 100 to achieve a balanced fill in each of the plurality of sidewalls 106, 108, 110, 112. The balanced fill may be achieved where the bottom surface 116 and the upper edge 114 of the storage container 100 may be completely injected with molten material 118 substantially simultaneously. In an even more specific example, the side shot injection molding process 104 may include injecting the molten material 118 with two injectors 126 on each of the first sidewall 106 and the second sidewall 108.

Figure 5:
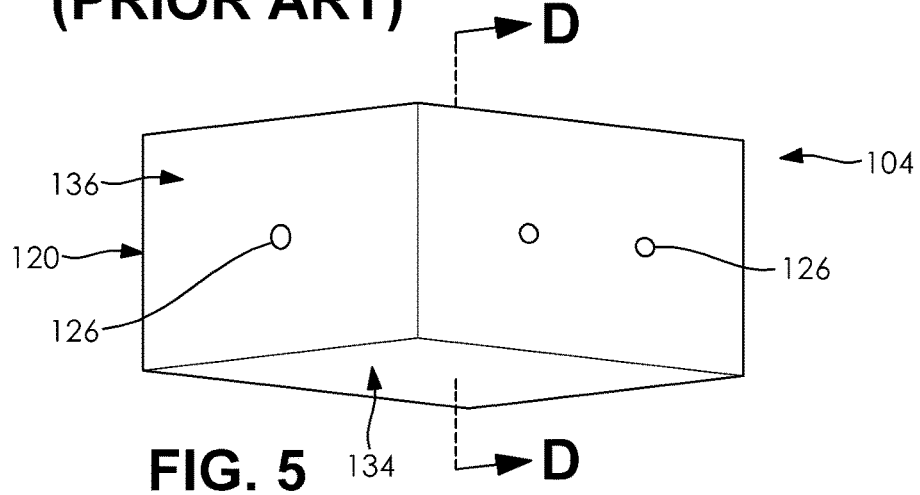
FIG. 5 is a bottom perspective view of a mold apparatus utilized in manufacturing the storage tote formed by the side-shot injection molding process, shown in FIGS. 2-3.
Figure 6:
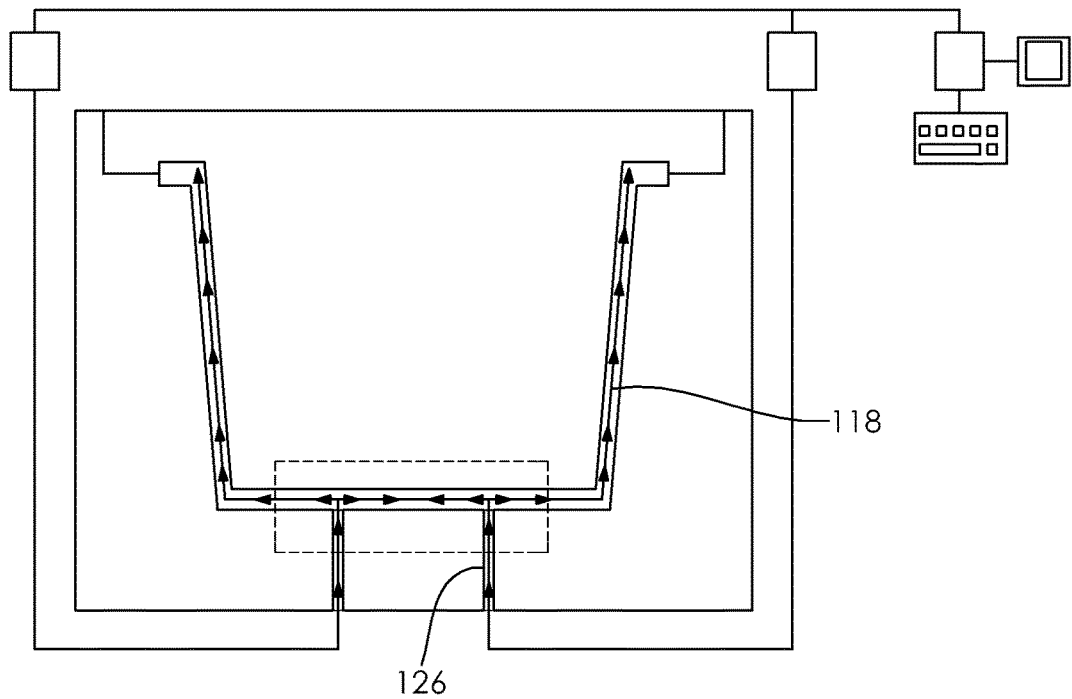
FIG. 6 is a cross-sectional, side elevational view of the prior art mold apparatus taken at section line C-C in FIG. 4.
Figure 7:
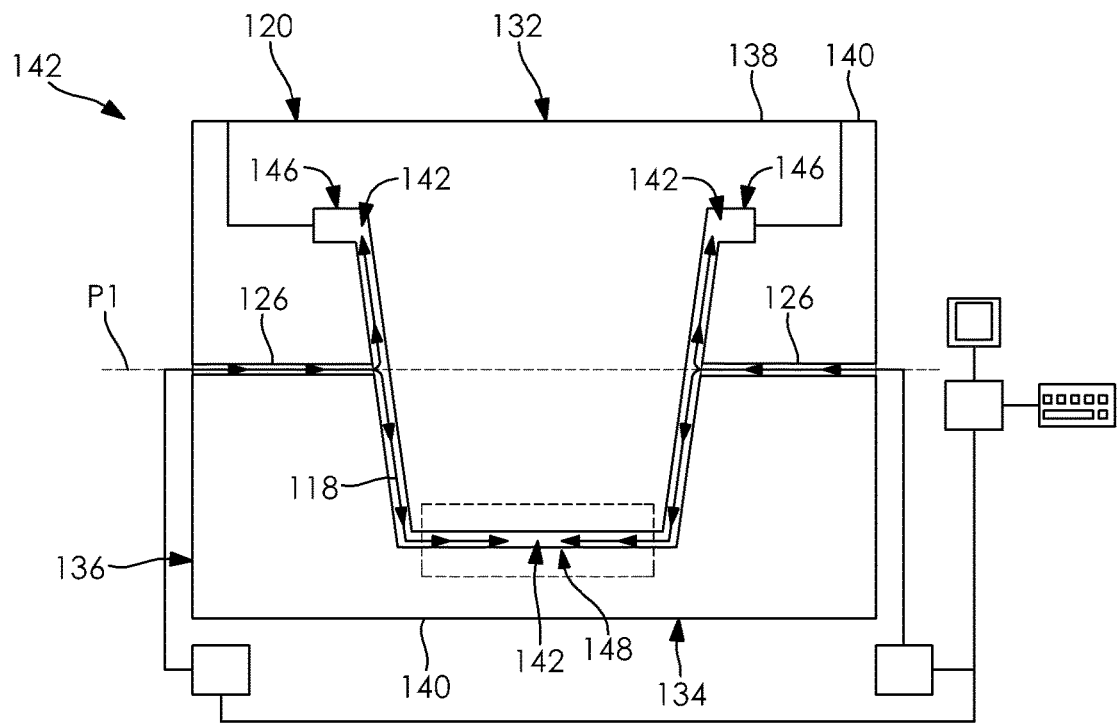
FIG. 7 is a cross-sectional, side elevational view of the mold apparatus taken at section line D-D in FIG. 5.

In a particular example, as shown in FIGS. 2, 5, and 13, the body 102 may be formed by a side shot injection molding process 104 that includes injecting a molten material 118 into each of the plurality of sidewalls 106, 108, 110, 112 of the storage container 100. In a more particular example, the side shot injection molding process 104 may include injecting the molten material 118 at each of the plurality of sidewalls 106, 108, 110, 112 of the storage container 100 using a plurality of injectors 126 on each of the first sidewall 106 and the second sidewall 108 and at least one injector 126 on each of the third sidewall 110 and the fourth sidewall 112. In an even more particular example, as shown in FIGS. 2-3, the side shot injection molding process 104 may include injecting the molten material 118 at each of the plurality of sidewalls 106, 108, 110, 112 of the storage container 100 on a first plane P1.

In one instance, the storage container 100 may have a weight that is about 15% less than a weight of the storage tote 122 formed by an injection molding process which includes injecting the molten material 118 at the base wall 123 of the storage tote 122.

Figure 1:
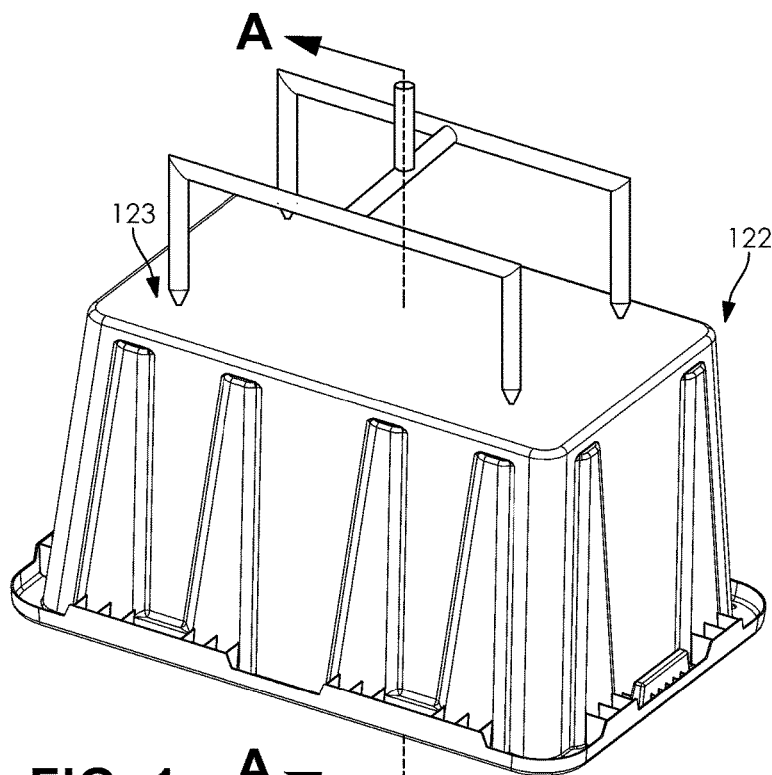
FIG. 1 is a bottom perspective view of a prior art storage tote.
Figure 11:
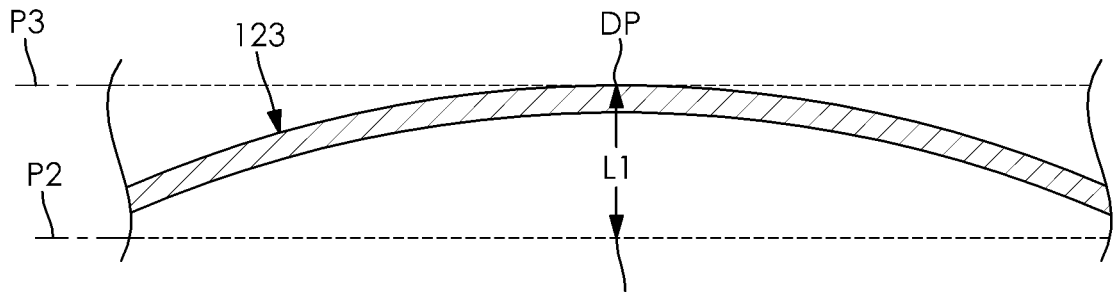
FIG. 11 is an enlarged, fragmentary, side elevational view of the prior art storage tote taken at call-out 10 in FIG. 9, depicting a tolerance of deflection of a base wall in the prior art storage tote as manufactured.
Figure 12:
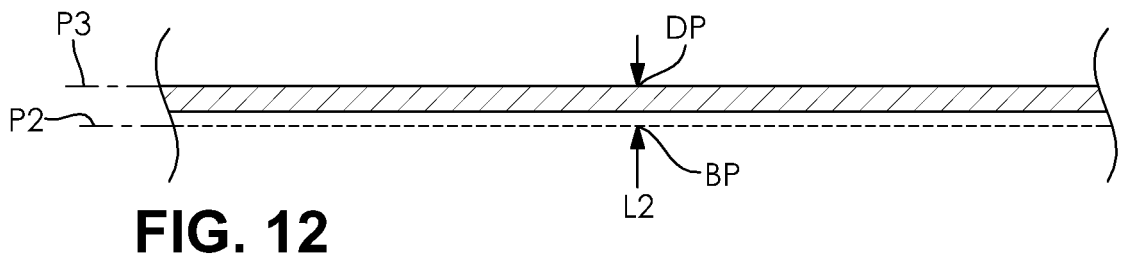
FIG. 12 is an enlarged, fragmentary, side elevational view of the storage tote taken at call-out 11 in FIG. 10, depicting a tolerance of deflection of a base wall of the storage tote as manufactured, the tolerance of deflection being superior to the tolerance of deflection shown in FIG. 10.

As shown in the prior art of FIGS. 1, and 11-12, the storage tote 122 formed by the injection molding process which includes injecting the molten material 118 at the bottom surface of the storage tote 122 will have a "tolerance of deflection" associated with the pressure and stress induced on the plastic materials during the injection molding manufacturing process. The tolerance of deflection, which is identified in FIG. 11 by "L1," may be defined as a distance between a baseline point BP on a second plane P2 and a deflection point DP on a third plane P3, and is a useful metric for the warping of the storage tote post-manufacturing. Each of the deflection point DP and the baseline point BP may be substantially centrally located adjacent a central area 128 of a base wall 123. In some instances, the deflection point DP is at an apex of the base wall 123 relative to the second plane P2. It should be appreciated that the baseline point BP is found at a hypothetical nominal location where there is no deflection of the base wall as manufactured. Additionally, the deflection point DP is found at a furthest location from the nominal location that is associated with deflection of the base wall 123 following the manufacturing of the storage tote 122. The baseline point BP and the deflection point DP may therefore be used to determine the tolerance of deflection L1.

Figure 9:
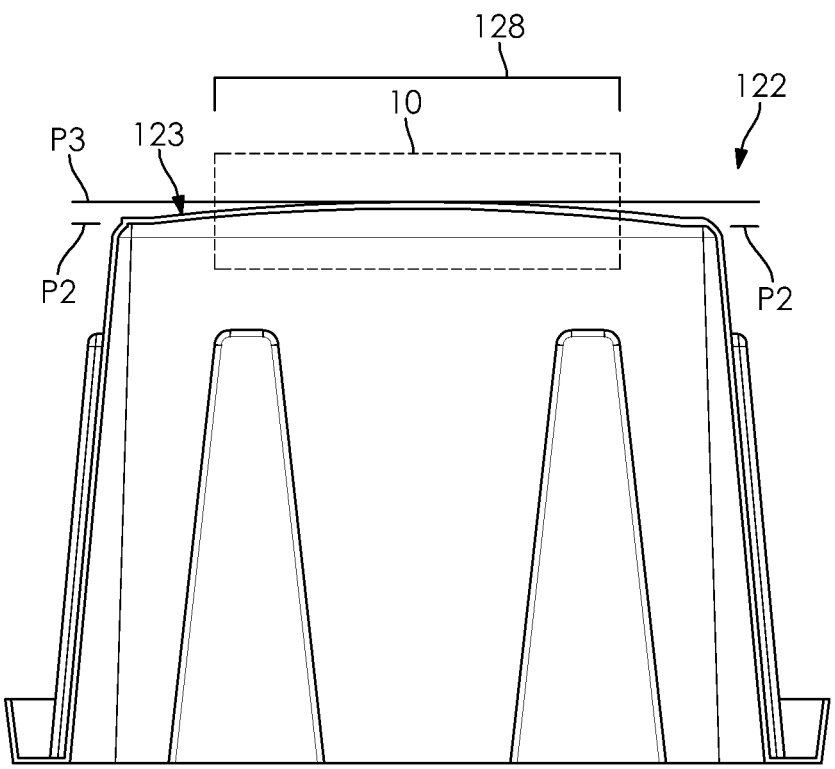
FIG. 9 is a cross-sectional, side elevational view of the prior art storage tote taken at section line A-A in FIG. 1.

With continued reference to the prior art storage tote 122 formed by the injection molding process which includes injecting the molten material 118 at the base wall 123 of the storage tote 122, as shown in FIGS. 1, 9 and 11, the tolerance of deflection L1 may be acquired by measuring a distance between the baseline point BP and the deflection point DP. It is known that the tolerance of deflection associated with the aforementioned prior art storage totes 122 are typically greater than about 0.15 inches.

Figure 10:
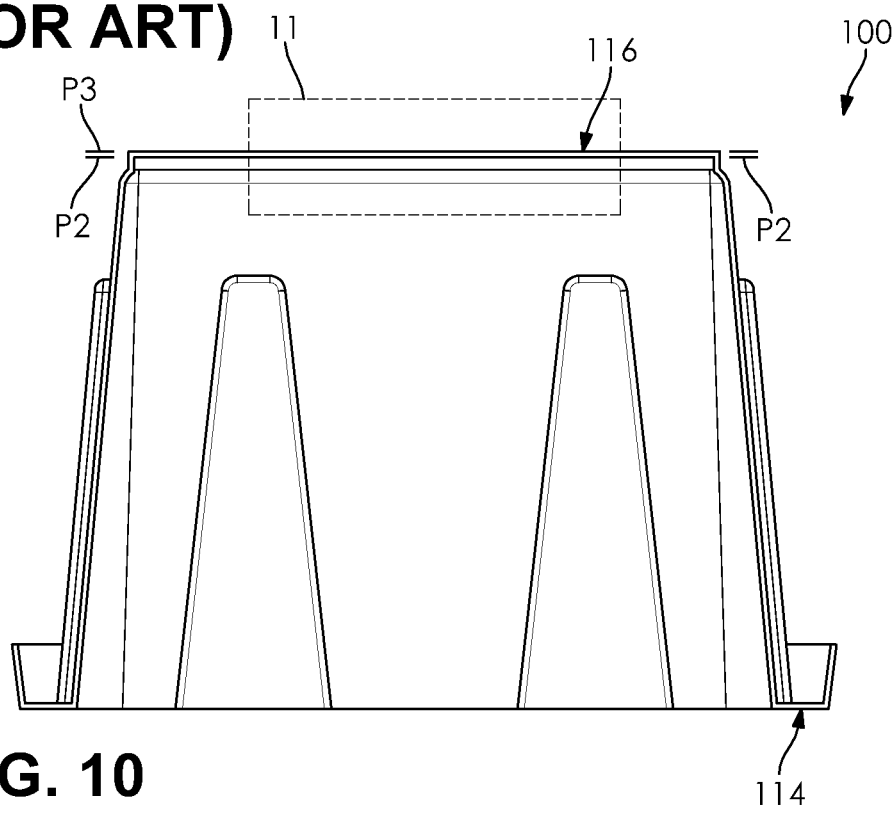
FIG. 10 is a cross-sectional, side elevational view of the storage tote formed by the side-shot injection molding process taken at section line B-B in FIG. 2.

Advantageously, and as shown in FIGS. 10 and 12, the bottom surface 116 of the storage container 100 of the present disclosure has a tolerance of deflection L2 that is significantly less than the tolerance of deflection L1 associated with the prior art storage tote 122 formed by the injection molding process which includes injecting the molten material 118 at the base wall 123 of the storage tote 122. In particular examples, it has been found that the tolerance of deflection L2 for storage containers 100 formed by the side shot injection molding process 104 is between thirty-three percent (33%) and fifty percent (50%) less than the tolerance of deflection L1 for prior art storage totes 122 of similar overall size and dimensions. This important reduction in the tolerance of deflection of the bottom surface 116 of the storage container 100 of the present disclosure is realized in minimal warping and improved durability of the storage container 100.

In particular, and with continued reference to FIG. 12, the tolerance of deflection L2 for the bottom surface 116 of the storage container 100 is less than 0.15 inches. In a more specific example, the tolerance of deflection L2 is between 0.07 inches and 0.11 inches. In an even more specific example, the tolerance of deflection L2 may be between 0.09 inches and 0.1 inches. In a most specific example, the tolerance of deflection L2 may be about 0.094 inches. It has been found that the tolerance of deflection L2 in these ranges results in a significant improvement in reducing warping and enhanced durability of the storage container 100, in operation, relative to the prior art storage totes 122 as described and shown in FIGS. 1, and 9-10. Other suitable deflection tolerances may also be accepted by the skilled artisan, for example, based on the overall size and dimensions of the storage tote 100 being manufactured, within the scope of the present disclosure.

In a certain example, the storage container 100 formed by the side shot injection molding 104 process may be more durable compared to a similar storage tote 122 formed by known injection molding processes. In a more specific example, the durability of the storage container 100 may be tested in a variety of manners such as a drop test and an impact resistance test. The drop test only awards a pass rating when the storage container 100 incurs no damage after dropping the storage container 100 three times from a height of thirty-six inches to a vinyl covered concrete slab (not shown). The impact resistance test only awards a pass rating where the storage container 100 incurs no cracking, chipping, or separation of material where the storage container 100 may be placed lying on the first sidewall 106 and a three ounce (+/−2%) steel ball may be dropped onto the second sidewall 108 of the storage container 100 from a height of 36 inches. Storage totes, such as storage tote 122, formed by known injection molding processes typically do not pass at least one of the drop test and the impact resistance test. Advantageously, the storage container 100 formed by the side shot injection molding process 104 passes each of the drop test and the impact resistance test. A skilled artisan may select other durability tests to identify the superior strength of the storage container 100 formed by the side shot injection molding process 104, within the scope of the present disclosure.

In a particular embodiment, as shown in FIG. 14, the storage container 100 formed by the side shot injection molding process 104 may include a method 200 for manufacturing the storage container 100. The method 200 may have a step 202 of providing a mold 120 having a top wall 132, a bottom wall 134, a plurality of side surfaces 136, and at least two separable sections 138, 140. The at least two separable sections 138, 140 may be selectively disposed in at least one of an open position (not shown) and a closed position 142. The first section 138 may be configured to selectively receive the second section 140, in operation. Where the mold 120 is in the closed position 142, a cavity 144 may be formed between the first section 138 and the second section 140. The mold 120 may further include at least one injector 126 disposed through at least one of the plurality of side surfaces 136 and directed at the cavity 144 where the mold 120 is in the closed position 142. The method 200 may include another step 204 of providing a molten material 118. Next, the method 200 may have a step 206 of positioning the at least one injector 126 at a desired height and a desired lateral position to achieve a balanced fill of the cavity 144. The balanced fill of the cavity may be achieved where a top end 146 of the cavity 144 and a bottom end 148 of the cavity 144 may be completely injected with molten material 118 substantially simultaneously. The method 200 may include an additional step 208 of injecting the molten material 118 through the at least one injector 126 disposed through the at least one of the plurality of side surfaces 136 of the mold 120 into the cavity 144. Afterwards, the method 200 may include a step 210 of removing the manufactured storage container 100 from the mold 120.

In one example, the side shot injection molding process 104 may have faster total production time than known methods. The total production time is the time required to form the storage container 100. In a more specific example, the total production time of the side shot injection molding process 104 is about 55% less than a total production time of the storage tote 122 formed by the injection molding process which includes injecting the molten material 118 at the base wall 123 of the storage tote 122.

Figure 8:
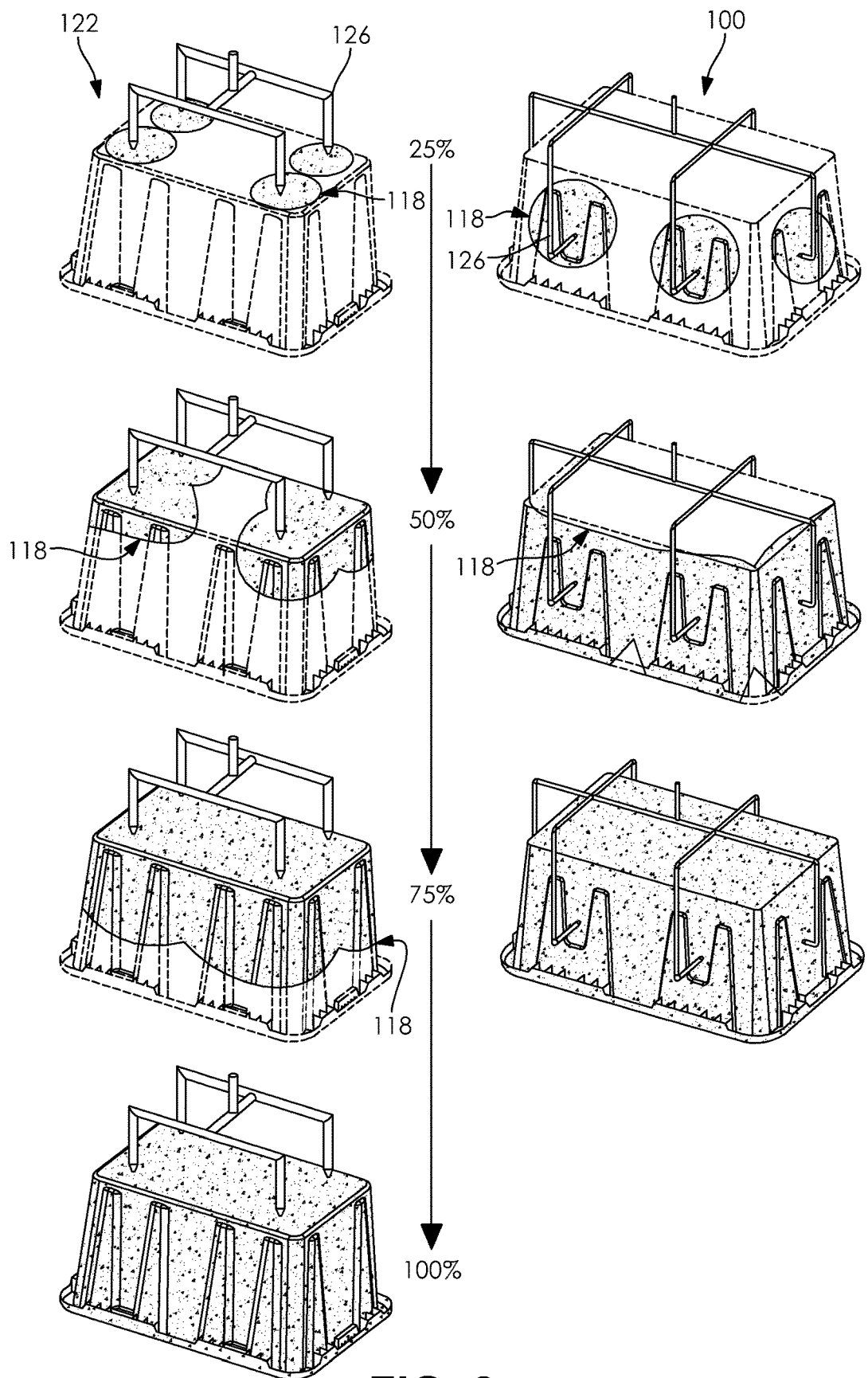
FIG. 8 is a series of top perspective views of each of a storage tote formed by conventional methods, as shown in FIG. 1, and the storage container formed by the side-shot injection molding process, as shown in FIG. 2, further depicting the storage container formed by the side-shot injection molding process filling at a faster rate than the storage tote formed by conventional methods.

In another example, as shown in FIG. 8, the storage container 100 formed by the side shot injection molding process 104 has a faster fill time than known methods. Fill time is the time required to fill the cavity 144 to form the storage container 100. In a more specific example, the fill time of the side shot injection molding process 104 is between eleven percent (11%) and forty-five percent (45%) faster than the fill time of a similar storage tote 122 formed by the injection molding process which includes injecting the molten material 118 at the bottom surface of the storage tote 122. With continued reference to FIG. 8, as a non-limiting example, it should be acknowledged that the storage container 100 is completely formed by the time indicator "75%," whereas the storage tote 122 formed by injecting the molten material 118 at the bottom surface of the storage tote 122 is not completely formed until the time indicator "100%." Advantageously, the faster fill time of the storage container 100 formed by the side shot injection molding process 104 may allow for a lower temperature molten material 118 to be required to form the storage container 100. Desirably, the lower temperature molten material 118 may completely form the storage container 100 without prematurely solidifying in the cavity 144 due to the faster fill time of the side shot injection molding process 104. In a certain embodiment, the injection molding process 104 has a fill time which is the time required to fill the cavity 144 to form the storage container 100, wherein the fill time is between 2.5 seconds and 4.0 seconds.

In a separate example, the side shot injection molding process 104 may include injecting the molten material 118 at a temperature between 350° F. and 550° F. The temperature of the molten material 118 in the prior art storage tote 122 formed by the injection molding process, which includes injecting the molten material 118 at the base wall 123 of the storage tote 122, typically requires a temperature above 550° F. Advantageously, the side shot injection molding process 104 may require a lower temperature of the molten material 118 which may reduce a molten material 118 heating time, a molten material 118 cooling time, and any energy required for additional heating of the molten material 118. A skilled artisan may select other suitable temperature ranges to form the storage container 100, within the scope of the present disclosure.

In a particular instance, the side shot injection molding process 104 may require a lower clamp force pressure than known methods. The clamp force pressure is the pressure required to hold the mold 120 in the closed position 142 to form the storage container 100 during the side shot injection molding process 104. In a more particular instance, the clamp force pressure is about 25% less than a clamp force required to form the prior art storage tote 122 by the injection molding process which includes injecting the molten material 118 at the base wall 123 of the storage tote 122.

In a separate embodiment, the body 102 formed by the side shot injection molding process 104 may further include at least one sprue mark 150 on at least one of the plurality of sidewalls 106, 108, 110, 112. The at least one sprue mark 150 is a physical indication of where the molten material 118 was injected at on the storage container 100 during the side shot injection molding process 104. As a non-limiting example, the sprue mark 150 may be a circle with a nub located in a substantially central location on the circle.

Advantageously, the method of manufacturing a storage container 100 with the side shot injection molding process 104 of the present disclosure requires less clamp tonnage, lower melt temperature, and injection pressure. Further, the resulting storage container 100 may have a lighter weight and have improved part quality, deflection, and strength where compared to a conventional storage tote 122, where the molten material 118 is injected at the base wall 123 of the storage tote 122.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for manufacturing a storage container with an injection molding process, the method comprising the steps of:

providing a mold having a top wall, a bottom wall, and a plurality of side surfaces, the plurality of side surfaces includes a first side surface, a second side surface, a third side surface, and a fourth side surface, the mold includes two sections, wherein the mold is in a closed position, a cavity is formed between the two sections, the mold further includes a plurality of injectors directed into the cavity when the mold is in the closed position, the plurality of injectors including a first pair of injectors disposed through the first side surface and a second pair of injectors disposed through the second side surface;

providing a molten material;

positioning the plurality of injectors along the plurality of side surfaces at a desired height and a desired lateral position to achieve a balanced fill of the cavity;

injecting the molten material through the plurality of injectors disposed through the plurality of side surfaces of the mold into the cavity and not through the bottom wall; and removing the manufactured storage container from the mold.

2. The method of claim 1, wherein the injection molding process has a total production time which is the time required to form the storage container, where the total production time of the storage container is about 55% less than a total production time of the storage container formed by the injection molding process but where the molten material is injected only at the bottom surface of the storage container.

3. The method of claim 1, wherein the injection molding process has a fill time which is the time required to fill the cavity to form the storage container, wherein the fill time is between 2.5 seconds and 4.0 seconds.

4. The method of claim 1, wherein the injection molding process includes injecting the molten material at a temperature between 350° F. and 550° F.

5. The method of claim 1, wherein the injection molding process has a clamp force pressure which is the pressure required to hold a mold in a closed position to form the storage container during the injection molding process, where the clamp force pressure is about 25% less than a clamp force required to form the storage container by the injection molding process but where the molten material is injected only at a bottom surface of the storage container.

6. The method of claim 1, wherein the plurality of injectors further includes an injector disposed through the third side surface and another injector disposed through the fourth side surface.

7. The method of claim 1, wherein the first sidewall and the second sidewall each have a first length, the third sidewall and the fourth sidewall each have a second length, and the first length is longer than the second length.

\* \* \* \* \*